United States Patent [19]

Heyes et al.

[11] Patent Number: 4,957,820
[45] Date of Patent: Sep. 18, 1990

[54] LAMINATED METAL SHEET

[75] Inventors: Peter J. Heyes, Wantage; Nicholas J. Middleton, Highworth, both of England

[73] Assignee: CMB Foodcan plc, Worcester, England

[21] Appl. No.: 378,214

[22] PCT Filed: Oct. 12, 1988

[86] PCT No.: PCT/GB88/00851
§ 371 Date: Jun. 9, 1989
§ 102(e) Date: Jun. 9, 1989

[87] PCT Pub. No.: WO89/03302
PCT Pub. Date: Apr. 20, 1989

[30] Foreign Application Priority Data

Oct. 15, 1987 [GB] United Kingdom ............... 8724237

[51] Int. Cl.$^5$ ..................... B28C 35/02; B32B 15/08
[52] U.S. Cl. ..................... 428/623; 428/626; 428/629; 428/667; 428/458; 428/483; 156/69; 156/272.2; 156/273.5; 156/308.2; 156/309.9
[58] Field of Search ............... 428/623, 626, 629, 667, 428/458, 483; 220/1 BC, 70, 83, 454, 455, 457; 156/69, 272.2, 272.4, 273.5, 274.4, 274.6, 274.8, 308.2, 309.6, 309.9

[56] References Cited

U.S. PATENT DOCUMENTS 4,058,647 11/1977 Inoue et al. ............... 156/308.2
4,631,155 12/1986 Caines ............... 156/272.2

FOREIGN PATENT DOCUMENTS 82717 5/1983 Japan ............... 156/272.2

Primary Examiner—Theodore Morris
Assistant Examiner—George Wyszomierski
Attorney, Agent, or Firm—Burns, Doane, Swecker & Mathis

[57] ABSTRACT

A process for producing by simultaneous lamination a polymer/metal/polymer laminate, which process comprises laminating to one of the major surfaces of a metal sheet a composite polyester film (A) comprising an inner layer (A1) of a substantially non-crystalline linear polyester having a softening point below 150° C. and a melting point above 150° C. but below 240° C. and an outer layer (A2) of a linear polyester having a melting point above 220° C., and simultaneously laminating to the other major surface of the metal sheet a polyolefin-containing film (B) comprising a bonding resin which is an acid modified polyolefin-resin containing carboxyl or anhydride groups, the metal sheet having been heated to a temperature $T_1$ sufficient to cause softening of the polymer films and intimate contact with the metal sheet, the temperature $T_1$ being below the temperature at which the outer surface of the polyolefin-containing film is damaged during lamination, and re-heating the resultant laminate to a temperature $T_2$ sufficient to cause each of the polymer films (A1) and (B) to interact with and become bound to the respective surface of the metal sheet. The laminates are useful for forming into containers or various components thereof.

46 Claims, 3 Drawing Sheets

LAMINATED METAL SHEET

The present invention relates to a process for producing laminated metal sheet and to laminated metal sheet so produced.

Lamination of polymer materials to metal sheet such as metal strip is a well known and well documented technique. The resultant laminates have many applications such as, for example, use for the manufacture of can bodies and can ends for containers for foodstuffs and beverages, and end components and valve cups for aerosol containers.

For many applications, a polymer film is laminated to each of the two major surfaces of the metal sheet. In general, most of the known lamination techniques are concerned either with the simultaneous application of polymer films of the same or similar composition to opposite faces of a metal sheet, or describe the lamination of polymer films having different compositions to the opposite faces of a metal sheet, each of the two different polymers being applied to the metal sheet in a separate step rather than simultaneously.

Whereas metal laminates having similar polymer coatings on both sides of the metal sheet or strip have many advantages, they are not suitable for all purposes. Thus, for example, while polyester coatings of the type described in GB No. 2123746 have excellent formability, they are not readily receptive to heat sealed closures, they are difficult to pigment to an acceptable level of opacity at viable cost, and they change in appearance on retorting.

Polypropylene or polyethylene coatings such as those described, for example, in GB No. 1324952 and EP No. 0062385 impart acceptable corrosion resistance to the metal sheet but are relatively soft, damage easily, have low melting points and relatively low gloss.

No single polymer embodies all of the various physical properties desired in coatings for metal/polymer laminates which are intended for use as can stock. Consequently it is found to be advantageous to use a combination of different polymers in a single polymer/metal/polymer laminate and utilize appropriately the properties conferred to the laminate by each polymer.

It is desirable, in many cases, to use dissimilar polymers laminated to the two surfaces of the metal sheet thereby making use of the different properties of the different polymers.

It is preferable, from an economic point of view, to apply the different polymer coatings to the metal sheet in a simultaneous operation, thereby reducing operational costs. The simultaneous application of the two different polymers can be achieved by the use of adhesives which are applied separately to the two different polymeric films followed by laminating these films simultaneously to the metal sheet. Alternatively, the required polymer films can be extrusion coated simultaneously in one single operation onto the two surfaces of the metal strip.

However, the first method is undesirable because it requires the use of solvent based materials which may contain biologically hazardous chemicals such as isocyanates and also involves lengthy cure schedules. The second method, which requires co-extrusion of molten polymers, would destroy the excellent properties of biaxially oriented polyester materials such as polyethylene terephthalate (PET), since such biaxially oriented materials cannot be extrusion coated and retain their excellent properties.

Thermal lamination of biaxially oriented PET to metal strip is known, for example from GB No. 2123746. Similarly, thermal lamination of polypropylene films to metal strip is disclosed for example, in GB No. 1324952 and U.S. Pat. No. 3679513, while thermal lamination of polyethylene films to metal strip is described, for example in EP No. 0062385 and U.S. 4452375. However, the conditions described in these documents for thermal lamination of polymer films having such varied properties are not suitable for the simultaneous thermal lamination of a polyester film, especially biaxially oriented polyethylene terephthalate film, to one side of a metal strip, while at the same time thermally laminating to the other side of the metal strip a polyolefin or polyamide-containing film of a thickness which is economically or technically viable for can stock usage.

We have now found that simultaneous thermal lamination of a polyester film to one side of a metal sheet and of a polyolefin or polyamide-containing film to the other side of the metal sheet can be readily achieved by matching the softening characteristics of the different polymers on each side of the metal sheet by providing an intermediate layer of a substantially non-crystalline polyester layer having certain specific physical characteristics between the metal sheet and the polyester layer which it is desired to adhere to the metal sheet, and by laminating the polymer films to the metal sheet using a thermal lamination process in which, in a first step, the polymer films are applied to the metal sheet at a first temperature which does not damage the outer surface of the films as they pass through the lamination nip, and, in a subsequent step, the resultant laminate is re-heated by indirect means to a second higher temperature so as to cause the polymer films to react with, and adhere strongly to, the metal sheet.

According to a first aspect of the present invention there is provided a process for producing by simultaneous lamination a polymer/metal/polymer laminate, which process comprises laminating to one of the major surfaces of a metal sheet a composite polyester film (A) comprising an inner layer (A1) of a substantially non-crystalline linear polyester having a softening point below 150° C. and a melting point above 150° C. below 240° C. and an outer layer (A2) of a linear polyester having a melting point above 220° C., and simultaneously laminating to the other major surface of the metal sheet a polyolefin-containing film (B) comprising a bonding resin which is an acid modified polyolefin-resin containing carboxyl or anhydride groups, the metal sheet having been heated to a temperature $T_1$ sufficient to cause softening of the polymer film and intimate contact with the metal sheet, the temperature $T_1$ being below the temperature at which the outer surface of the polyolefin-containing film is damaged during lamination, and re-heating the resultant laminate to a temperature $T_2$ sufficient to cause each of the polymer films (A1) and (B) to interact with and become bound to the respective surface of the metal sheet.

According to a second aspect of the present invention there is provided polymer/metal/polymer laminate comprising a metal sheet having a polymer film adhered to each of its major surfaces, the polymer films having been adhered to the metal sheet by simultaneous thermal lamination, the polymer film adhered to one major surface of the metal sheet being a composite polyester film (A) comprising an inner layer (A1) of a substantially non-crystalline linear polyester having a softening point below 150° C. and a melting point above 150° C. but below 240° C. and an outer layer (A2) of a linear polyester having a melting point above 220° C., and the polymer film adhered to the other major surface of the metal sheet being a polyolefin-containing film (B) comprising a bonding resin which is an acid modified polyolefin resin containing carboxyl or anhydride groups.

The polyolefin-containing film (B) may be a monolayered film of a bonding resin which is an acid modified polyolefin resin containing carboxyl or anhydride groups, or may be a composite film comprising an outer layer (B2) of a polyolefin or a polyamide adhered to an inner (or tie) layer (B1) of a bonding resin as defined above.

In a further embodiment of the present invention, the composite film (B) may include a further polyolefin or polyamide layer (B4) adhered to the said outer layer (B2) by means of an intermediate layer (B3) of a bonding resin which is as defined above for layer (B1).

Preferably composite films (A) and (B) are films which have been prepared by co-extrusion.

By means of the process of the present invention it is possible to obtain a metal/polymer laminate incorporating biaxially oriented polyester materials such as polyethylene terephthalate on one side of a metal sheet with polyolefin or polyamide containing coatings on the other side of the metal sheet. By use of the present process both polymer coatings can be applied simultaneously while avoiding the use of solvent containing, environmentally undesirable, adhesives.

The process of the present invention is carried out in a number of stages. In a first stage, the metal is pre-heated to a temperature $T_1$ in the range of 120° C. to 240° C., preferably 140 to 220° C., such that the outer surface of film (B) is not raised above its melting point in the lamination nip, and preferably not above its softening point.

In a second stage, the films and metal are brought together in a lamination nip thereby establishing intimate and uniform, wrinkle-free, contact. At this stage the contact layers are the inner layer (A1) of amorphous polyester, metal and on the opposite side of the metal, the inner face of polyolefin or polyamide-containing film (B).

In a third stage, the resultant laminate is re-heated, preferably by induction heating the metal core to a temperature $T_2$ above 230° C., but below the thermal or oxidative degradation point of the outer face of the polyolefin or polyamide containing film (B) or the temperature at which the outer layer physically degrades when quenched rapidly with water. If desired, infra-red heating may be used.

While the outer surface of the polyester film (A) is maintained below its melting point, but with the metal core above the melting point of the said polyester, rapid interaction occurs between the metal, the inner polyester layer (A1) and the polyolefin layer (B) In order to achieve this interaction, the laminate is held above 200° C. for 1 to 30 seconds, preferably at about 250° C. for 2 seconds, and thereafter the laminate is rapidly and uniformly quenched by water to a temperature below the softening point of the resin having the lowest softening temperature.

We have found that provided the outer surface of the biaxially oriented polyester film (A) remains below its melting point, a sufficient proportion of the excellent properties of the biaxially oriented polyester film, e.g. polyethylene terephthalate, can be retained. The temperature in the post lamination zone can be varied to control the properties, particularly formability, which are desired in the polyester coating. Such control can be achieved quite readily if induction heating is used to re-heat the laminate downstream of the lamination nip. Preferably a suitable pyrometer may be used to identify the temperature of the polyester. Alternatively, devices that recognise the change from biaxial orientation to crystalline non-oriented or amorphous polyester may be used to indicate the critical state of the polyester film (for example, an X-ray diffractometer).

The precise temperature $T_1$ to which the metal sheet should be heated prior to lamination depends both on the thickness of the films to be laminated and also on the chemical nature of the said films. Thus, temperatures of approximately 120° C. and above, typically 140° C., are suitable for a 20 micron cast polypropylene film, up to 230° C. for a thicker 200 micron cast polypropylene film. Temperatures of 140° C. to 270° are suitable for coextruded biaxially oriented polyethylene terephthalate.

Polyamide containing films will tolerate slightly higher metal temperatures than cast polypropylene and oriented polypropylene demands a higher temperature than cast polypropylene, typically 200° C. for a 20 micron film.

The temperature $T_2$ to be used on re-heating the laminate downstream of the lamination nip is typically in the range 230 to 270° C. The exact temperature to be used will depend on the dwell time before the laminate is quenched. Temperatures higher than 270° C. lead to physical damage of the polyolefin film when it comes into contact with quench water and lead to melting of the polyethylene terephthalate films. The temperature at the lower end of the said range is determined by the need to achieve a satisfactory bond strength between the metal sheet and the polymer films attached thereto in the very short time during which the laminate is heated to the required temperature. Commercial operations generally demand a dwell time of approximately two seconds only.

The metal substrate to which the polymer films are applied, typically in the form of metal strip, is generally steel or aluminium or alloys thereof, typically a steel or aluminium based product used in the packaging industry.

The gauge range is typically 0.05 mm to 0.4 mm for steel and 0.02 mm to 0.4 mm for aluminium.

The steel may be coated with tin, preferably passivated by conventional chromic treatments or alternatively may be in the form of nickel or zinc plated steel, blackplate or phosphated blackplate, which is preferably chromate rinsed after phosphating.

The preferred steel finish is electrolytically chromium coated steel (ECCS) with a dual layer of chromium metal and chromium oxide. With such steels, the chromium metal and chromium oxide levels can vary widely. Typically, the chromium metal content ranges from 0.1 to 0.20 gm/m², while the chromium oxide ranges from 0.005 to 0.05 gm/m². The ECCS is commonly derived from deposition systems containing either sulphur containing or fluorine containing catalysts. The composite polyester film (A) is preferably one which has been prepared by co-extrusion prior to application to the metal strip. The composite polyester film (A) comprises a thinner inner layer (A1) of a substantially non-crystalline (i.e. amorphous) linear polyester which has a softening point below 150° C. and a melting point about 150° C. but below 240° C., and a thicker outer layer (A2) having a melting point above 220° C., and preferably having an intrinsic viscosity of from 0.5 to 1.1, preferably 0.6 to 0.8.

Preferably the outer layer (A2) is a biaxially oriented polyester such as polyethylene terephthalate. Preferably the inner layer (A1) is a linear copolyester, for example an amorphous copolymer of approximately 80 mole % ethylene terephthalate and approximately 20 mole ethyleneisophthalate. Copolyesters of terephthalic acid and two alcohols, for example ethylene glycol and cyclohexane-dimethanol, are also suitable for use as the inner layer (A1).

Typically, the biaxially oriented polyester in outer layer (A2) has a crystallinity greater than 30%, preferably from 40 to 50%.

The crystallinity of a polyester material can be estimated by X-ray diffraction techniques as described in GB No. 1566422 or from measurement of density and applying the relationship:

$$V_c = (P - Pa)(Pc - Pa)^{-1}$$

where $V_c$ = Volume fraction crystallinity
 $P$ = density of sample
 $P_a$ = density of amorphous material
 $P_c$ = density of crystalline material P can be measured in a density column using zinc chloride/water or n-heptane/carbon tetrachloride mixtures.

The biaxially oriented film which may be used as the outer layer may be formed by stretching the amorphous extruded polymer in the forward direction at temperatures above the glass transition temperature of the polymer by a factor of 2.2 to 3.8 and similarly in the transverse direction by 2.2 to 4.2. Where the laminated coating is to be used in deep drawing metal containers, the orientation is preferably limited to stretching by a factor approximately 2.5 in both forward and transverse directions.

Most preferred heat setting temperatures of biaxially oriented PET film lie in the range 215° to 220° C.; lower heat setting temperatures may be used but are usually accompanied by an increased tendency for the polyester film to shrink during lamination.

Typically the inner layer (A1) should be continuous and have a typical thickness of about 2 to 5 microns. The ratio of the thickness of the outer polyester layer (A2) to the inner polyester layer (A1) is between 12 and 4, with the total thickness of the combined layers being from 12 to 25 microns.

If desired, the polyester layers may contain inorganic anti-blocking agents such as synthetic silica having an average particle size of from 0.5 to 5 microns.

Also, if desired, the outer polyester layer (A2) may be pigmented using conventional pigments such as titanium dioxide.

The principal function of the inner polyester layer (A1) is to heat seal to the metal surface at temperatures below the melting point of the outer polyester layer (A2). It is important that the inner layer should retain its amorphous nature after orientation and heat setting of the film. Furthermore the inner polyester layer (A1) should bond to the metal at temperatures which are compatible with the simultaneous lamination to the opposite side of the metal sheet of a polyamide or polyolefin containing coating. This requirement is met by ensuring that the inner layer of polyester (A1) has a softening point compatible with the temperatures needed to laminate a wide range of polyolefin or polyamide based coatings. For this purpose the softening point should be lower than 150° C., typically not greater than 130° C.

Preferably the polyolefin in outer layer (B2) is polypropylene, or polyethylene, or an ethylene-propylene copolymer. If desired other polyolefins such as polymethyl pentene may be used.

The polyolefin-containing film (B) or the bonding resin layer (B1) in a composite film (B) is an acid-modified polyolefin resin containing carboxyl or anhydride groups. Typical acids for use in preparing such acid-modified polymers are ethylenically unsaturated carboxylic acids such as acrylic acid, methacrylic acid, maleic acid, fumaric acid, crotonic acid, and itaconic acid. Typical anhydrides used for the same purpose are ethylenically unsaturated carboxylic anhydrides such as maleic anhydride.

The acid groups can be present as copolymers of ethylene, for example ethylene/acrylic acid (EAA) or ethylene/methacrylic acid (EMMA). Typically the acid concentration is 5 to 15%.

The acid modification of the acid modified polymers can be obtained, for example, by grafting maleic anhydride to a polyolefin such as polypropylene, polyethylene, ethylene-propylene or ethylene-vinylacetate copolymer. The graft can be introduced by techniques such as reacting maleic anhydride with polyolefin in solution in an organic solvent and using a free radical catalyst such as dibenzoyl peroxide or dicumyl peroxide. Alternatively, an active centre can be introduced into the polymer by using high energy radiation such as gamma rays or X-rays and then reacting the resultant material with the anhydride.

The bonding resin preferably contains 0.05% to 0.5%, more preferably 0.1% to 0.25% acid modification, measured by analysis of infra red adsorption at 1790 cm$^{-1}$, of resin pre-dried at 200° C. to convert acid functionality to anhydride functionality.

The anhydride graft-modified polyolefin can be diluted with further unmodified polyolefin to produce a bonding resin preferably having a content of grafted acid (i.e. a graft level) of 0.02 to 0.6%, most preferably 0.2±0.05%. The diluting unmodified polyolefin can be the same polyolefin which has been used to produce the acid modified polyolefin, or it can be a different polyolefin. Thus, for example, an acid modified low-density polyethylene (LDPE) or linear low-density polyethylene (LLDPE) can be diluted with polypropylene, or an acid modified polypropylene can be diluted with a polypropylene or an ethylene propylene random copolymer.

The purpose of the inner layer (B1) of bonding resin is to tie the outer layer (B2) of polyolefin or polyamide to the metal surface. Preferably when the outer polyolefin layer (B2) is a polyethylene, the bonding resin base of the inner tie layer (B1) is a polyethylene or ethylene copolymer. Preferably when the outer polyolefin layer (B2) is a polypropylene homopolymer or an ethylene-propylene copolymer, the bonding resin base of inner tie layer (B1) is a polypropylene or an ethylene propylene random copolymer. When the outer layer (B2) is a polyamide, the bonding resin layer can be based on a polyethylene or a polypropylene.

Preferably, for a bonding resin layer based on polypropylene, the bonding resin melt flow index is 3 to 30 gm/10 minutes, measured at 230° C. by the ASTM test No. D1238.

Particularly preferred bonding resin layers are based on random ethylene-propylene copolymers or blends of low-density polyethylene (LDPE) with polypropylene or blends of linear low-density polyethylene (LLDPE) with polypropylene.

A particularly preferred acid modified olefin copolymer is maleic-anhydride modified ethylene vinyl acetate.

The layer of bonding resin (B1) in a composite polymer film (B) is preferably of a thickness of from 1 to 10 microns.

In a further embodiment of the present invention, a further polyamide or polyolefin layer (B4) may be adhered to the outer layer (B2) by means of a further bonding resin layer (B3), the said bonding resin layer (B3) being as defined above for bonding resin layer (B1). If desired, any of layers (B1) to (B4) may be pigmented in conventional manner, with titanium dioxide for example. The preferred arrangement is for pigment to be in layer (B2) or in layers (B2) and (B4). Preferably the outer polyolefin or polyamide layer may contain inorganic anti-blocking agents such as synthetic silica having a particle size of from 0.5 to 5 microns.

Throughout this specification, intrinsic viscosities are measured at 25° C. in O-chlorophenol solutions at a concentration of 5g/l.

The following Examples are now given by way of further illustration of the present invention.

EXAMPLES 1 to 24

Figures 11A, 11B:
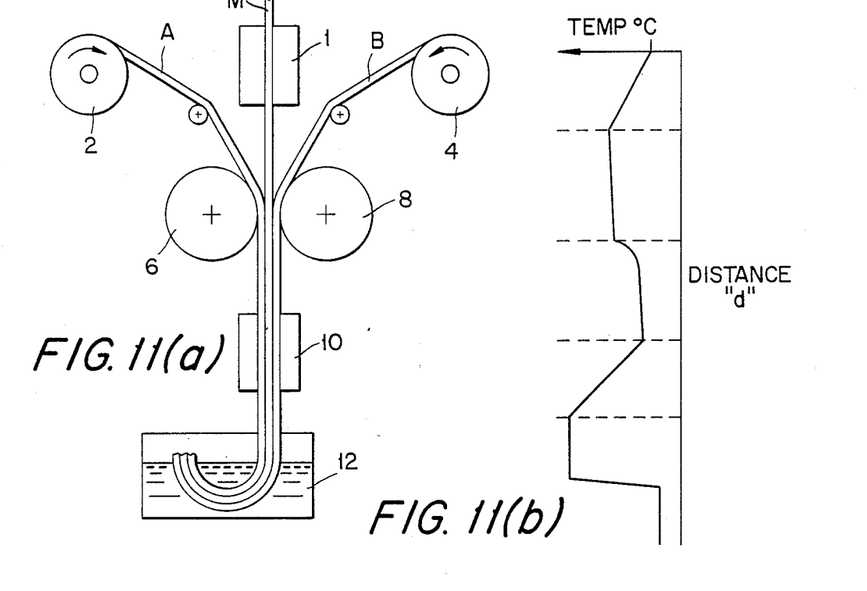
FIGS. 11 and 12 show diagramatically the lamination process of the present invention.
Figure 12:
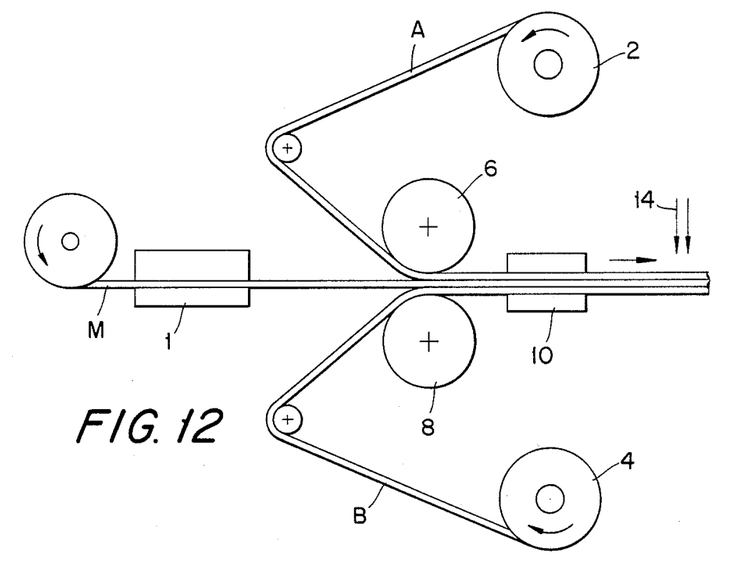

Polymer/metal/polymer laminates were prepared by a lamination process performed in apparatus as illustrated schematically in FIG. 11 or FIG. 12 of the accompanying drawings. A metal sheet M was pre-heated to an appropriate temperature $T_1$ by a heater 1. Temperature $T_1$ is usually within the range 120° to 220° C. A polyester film A was fed from a feed roll 2 and a polyolefin-containing film was fed from a feed roll 4 and laminated to the opposite sides of the pre-heated metal sheet between lamination rolls 6, 8, typically having a diameter of 100–400 mm. Lamination was generally performed using a nip force of 200–400 N per metre between the lamination rolls.

In the lamination nip, intimate and uniform, wrinkle-free contact between the metal sheet and the polymer films is established. Downstream of the lamination rolls the resultant laminate is re-heated, preferably by use of an induction heater 10, to a temperature $T_2$ at which each of the polymer films A and B will interact with and become bound to the metal sheet. Temperature $T_2$ is usually within the range 230 to 270° C. The metal polymer laminate is held at temperature $T_2$ or a temperature slightly below $T_2$ for a short period of time, usually no more than 2 seconds, and is then rapidly and uniformly quenched with water to a temperature below the melting point of the polyolefin-containing film (B). Quenching can be performed in any conventional manner, but typically can be performed by passing the laminate through a tank 12 of water as shown in FIG. 11 or by passing the laminate through curtain 14 of quenching water as shown in FIG. 12.

In general, the process illustrated in FIG. 11 with the lamination being performed in a vertical mode is preferred. Vertical movement of the metal strip through the lamination stage tends to allow a higher quench rate and gives better and more uniform quenching.

FIG. 11 also shows a schematic diagram of a typical temperature profile which would be found in the process illustrated in the apparatus of FIG. 11.

Table 1 sets out the types of polymer which were laminated to the metal strip and the thickness of each layer. The conditions used to perform the lamination and the results obtained are given in Table 2.

The polyester film A applied to the metal strip may be in the form of a film having a single layer (as in the case of Examples 11 to 14 which are given by way of comparison); in these cases the nature of the polymer is set out in the column in Table 1 headed A1. Alternatively the polyester film A may be a composite film of an inner layer A1 and an outer layer A2, usually prepared by co-extrusion of the appropriate polymer films; such films are films in accordance with the invention.

Figure 1:
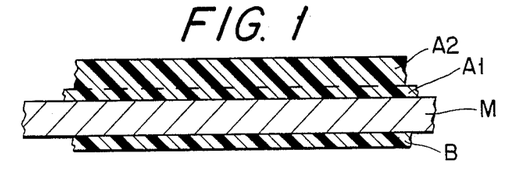
FIGS. 1, 2, and 3 show lateral views of various polymer-metal-polymer laminates according to the present invention.

The polyolefin film B may contain only a single layer B1 as in the case of the laminate illustrated in FIG. 1, or may be a composite film containing a plurality of layers B1, B2, B3, B4, prepared typically by co-extrusion of the appropriate polymer films.

FIG. 1 of the accompanying drawings illustrates a polymer/metal/polymer laminate having a composite polyester film A1/A2 laminated on one side of a metal sheet M with a single layer polyolefin-containing film B1 laminated to the opposite side of the film. The laminates which are the subject of Examples 1 to 3, 17 and 18 are laminates having this structure.

Figure 2:
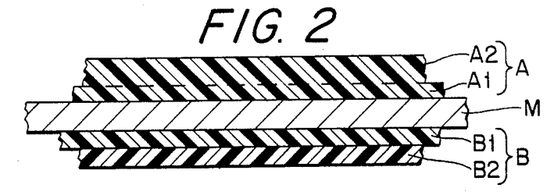

FIG. 2 of the accompanying drawings illustrates a polymer/metal/polymer laminate having laminated thereto a composite polyester film A1/A2 on one side of the metal sheet and a composite polyolefin-containing film B1/B2 laminated to the opposite side of the metal sheet. The laminates which are the subject of Examples 4 to 8, 15, 16 and 19 to 24 are laminates having this structure. Examples 9 and 10 have this structure but carry two additional outer layers, B3 and B4 on the polyolefin coated side of the metal sheet.

Figure 3:
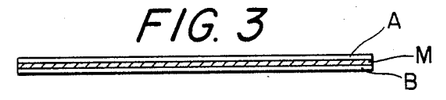

FIG. 3 illustrates a polymer/metal/polymer laminate in which each of polymer films A and B have a single layer. The films of Examples 11 and 12 are of this type.

The metal/polymer laminate structures of Examples 1 to 10 and 15 to 23 are structures suitable for processing in accordance with the present invention. Table 2 gives examples of the lamination behaviour under different conditions of the various laminate structures set out in Table 1.

Table 2 shows that if the temperature of the metal sheet on lamination is raised to a level which is too high, the polyolefin coatings adhere to the lamination rolls (Cases D, E, F and I). Furthermore, if the temperature of the metal sheet on lamination is kept too low, and no polyester inner layer (A1) in accordance with the invention is present, the polyester film does not adhere adequately to the metal sheet (Cases G and H).

TABLE 1

COMPOSITION OF METAL POLYMER LAMINATES

| EXAMPLE | LAYER A2 | LAYER A1 | M | LAYER B1 | LAYER B2 | LAYER B3 | LAYER B4 |
|---|---|---|---|---|---|---|---|
| 1 | Biaxial PET (12μ) | Polyester A (3μ) | E | Bonding Resin 1 (20μ) | | | |
| 2 | As above | As above | E | Bonding Resin 2 (25μ) | | | |
| 3 | As above | As above | E | Bonding Resin 3 (50μ) | | | |
| 4 | As above | As above | E,A | Bonding Resin 1 (2μ) | Polypropylene (18μ) | | |
| 5 | As above | As above | E | Bonding Resin 2 (5μ) | High density Polyethylene (20μ) | | |
| 6 | Biaxial PET (12μ) | Polyester A (3μ) | E | Bonding Resin 2 (5μ) | Low density Polyethylene (20μ) | | |
| 7 | As above | As above | E | Bonding Resin 3 (5μ) | High density Polyethylene (20μ) | | |
| 8 | As above | As above | E,A | Bonding Resin 3 (5μ) | Low density Polyethylene (20μ) | | |
| 9 | As above | As above | E,A | Bonding Resin 1 (2μ) | Polypropylene (29μ) | Bonding Resin 1 (2μ) | Polyamide (5μ) |
| 10 | As above | As above | E | As above | As above | As above | Polymethyl-pentene (5μ) |
| 11 | | Biaxial PET heat set above 215° C. (12μ) | E | Bonding Resin 1 (20μ) | | | |
| 12 | | Biaxial PET heat set below 210° C. (12μ) | E | Bonding Resin 1 (20μ) | | | |
| 13 | | Biaxial PET heat set above 215° C. (12μ) | E | Bonding Resin 1 (2μ) | Polypropylene (18μ) | | |
| 14 | | Biaxial PET heat set above 215° C. (12μ) | E | Bonding Resin 1 (2μ) | Polypropylene (29μ) | Bonding Resin 1 (2μ) | Polyamide (5μ) |
| 15 | Biaxial PET (12μ) | Polyester A (3μ) | E | Bonding Resin 1 (10μ) | Polypropylene (90μ) | | |
| 16 | PET (13μ) | Polyester A (5μ) | E | Bonding Resin 1 (2μ) | Polypropylene (18μ) | | |
| 17 | Biaxial PET (12μ) | Polyester A (3μ) | E | Bonding Resin 4 (50μ) | | | |
| 18 | As above | As above | E | Bonding Resin 5 (50μ) | | | |
| 19 | As above | As above | E | Bonding Resin 1 (2μ) | Polypropylene (18μ) | | |
| 20 | As above | As above | E | Bonding Resin 6 (2μ) | As above | | |
| 21 | Biaxial PET (12μ) | Polyester A (3μ) | E | Bonding Resin 7 (2μ) | Polypropylene (18μ) | | |
| 22 | As above | As above | E,A,T,B | Bonding Resin 1 (2μ) | Polypropylene (38μ) | | |
| 23 | Biaxial PET having low draw ratio (2.5 by 2.5) (12μ) | Polyester A (3μ) | E | Bonding Resin 1 (2μ) | Polypropylene (18μ) | | |
| 24 | | Biaxial PET | E | Bonding Resin 1 | Polypropylene | | |

TABLE 1-continued

| | | COMPOSITION OF METAL POLYMER LAMINATES | | | | | |
|---|---|---|---|---|---|---|---|
| EXAMPLE | LAYER A2 | LAYER A1 | M | LAYER B1 | LAYER B2 | LAYER B3 | LAYER B4 |
| | (12μ) | | (10μ) | (90μ) | | | |

KEY TO TABLE 1

Polyester A: In Examples 1 to 10, 15, 17–22 and 23 a non-crystalline (i.e. amorphous) polyester which was an 80:20 copolymer of ethylene terephthalate and ethylene isophthalate was used. The softening point of the polyester was below 150° C. and the melting point of the polyester was 210° C. The intrinsic viscosity of the polyester was from 0.6 to 0.7.

In Example 16, the amorphous polyester was a copolyester of terephthallic acid and ethylene glycol and cyclohexane dimethanol. The softening point of the polyester was below 150° C. and the melting point of the polyester was 180° C. The intrinsic viscosity of the polyester was above 0.9 and below 1.1.

Bonding Resin 1: Maleic anhydride graft modified ethylene propylene random copolymer having graft levels of about 0.2 0.05.
Bonding Resin 2: Maleic anhydride graft modified polyethylene having graft levels of about 0.08 ± 0.05.
Bonding Resin 3: Ethylene/Acrylic Acid Copolymer (EAA) typically having 6% or 9% acrylic acid.
Bonding Resin 4: Ethylene Methacrylic Acid Copolymer (EMAA) typically having 9% or 12% methacrylic acid.
Bonding Resin 5: Maleic anhydride graft modified ethylene vinylacetate copolymer having graft levels of about 0.08 ± 0.05.
Bonding Resin 6: Maleic anhydride graft modified polypropylene homopolymer having graft levels of about 0.2 ± 0.05.
Bonding Resin 7: Maleic anhydride graft modified ethylene-propylene block copolymer having graft levels of about 0.2 ± 0.05.
PET: Polyethylene terephthalate.
Biaxial PET: Biaxially oriented polyethylene terephthalate having a melting point of 255° C.
Polyamide: Nylon 6.
Metal Strip M: This may be ECCS (represented by E), aluminium or an alloy thereof (represented by A), tinplate (represented by T), or blackplate (represented by B).

TABLE 2

| | | METAL TEMPERATURE (°C.) | | |
|---|---|---|---|---|
| CASE | EXAMPLE NO. | Before Lamination | After Lamination | LAMINATION BEHAVIOUR |
| A | 1 to 10, 16–23 | 140–150 | 250 | Satisfactory |
| B | 9, 10 | 160–180 | 250 | Satisfactory |
| C | 15 | 170–190 | 250 | Satisfactory |
| D | 1 to 8, 16–22 | >170 | 250 | Polyolefin adheres to lamination roll |
| E | 9, 10 | >200 | 250 | Polyolefin/Polyamide adheres to lamination roll |
| F | 15 | >210 | 250 | Polyolefin adheres to lamination roll |
| G | 11–13 | 150 | 250 | PET does not adhere in lamination stage |
| H | 14, 24 | 180 | 250 | PET does not adhere in lamination stage |
| I | 11–14, 24 | 270 | 250 | Polyolefin coatings adhere to the lamination roll |

COMMENTS

Cases A, B and C - Illustrate the materials and process described in this invention, successfully applied.
Cases D, E and F - Illustrate the limits imposed by the polyolefin coatings on the lamination temperature. The polyester laminated successfully in D-F.
Cases G, H and I - Combinations of materials described in the prior art, showing their incompatibility at the low (G,H) and high (I) lamination temperatures needed to laminate polyolefins and biaxially oriented PET monofilms respectively.

EXAMPLES 25 to 51 (see Table 3)

These Examples illustrate a number of components for metal packaging containers and closures which can be advantageously produced from the polymer/metal/polymer laminates produced in accordance with the present invention. Illustrations of the typical shapes of typical products are shown in FIGS. 4 to 10 of the accompanying drawings.

Table 3 indicates the nature of the metal sheet (M), the types of polymer films (A) and (B) which are laminated thereto, and states for each application which polymer film constitutes the external coating (C) of the product and which polymer film constitutes the internal coating (D) of the product.

Figure 4:
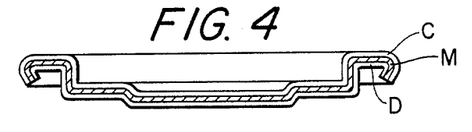
FIGS. 4 thru 10 show shapes of typical products (metal containers and closures) which can be advantageously produced from such composites.

The laminates described in Examples 25 to 31 were formed by conventional techniques into food can ends such as that illustrated in FIG. 4 of the accompanying drawings.

Figure 5:
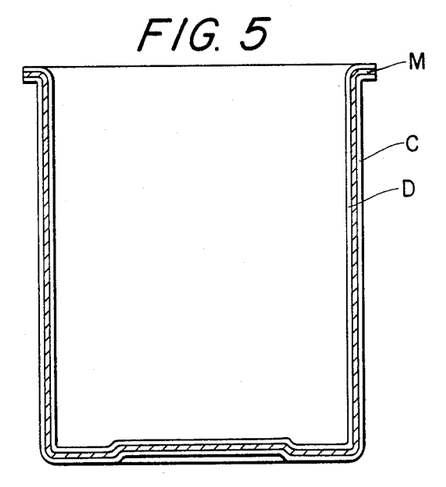

The laminates described in Examples 32 to 34, and 51 were formed by conventional techniques into drawn cans (draw-redraw cans) such as that illustrated in FIG. 5 of the accompanying drawings.

Figure 6:
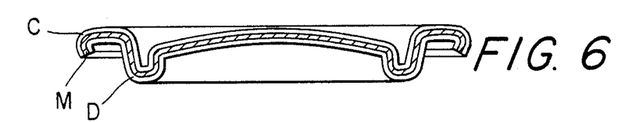

The laminates described in Examples 35 to 38 were formed by conventional techniques into easy open beverage can ends such as that illustrated in FIG. 6 of the accompanying drawings.

Figure 7:
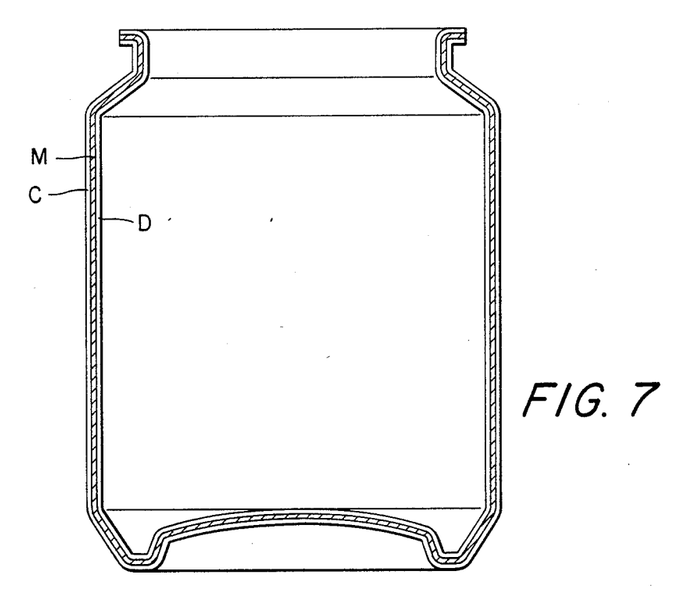

The laminates described in Examples 39 and 40 were formed in conventional manner into drawn wall ironed cans such as that illustrated in FIG. 7 of the accompanying drawings.

Figure 8:
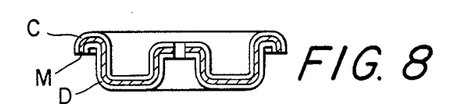
Figure 9:
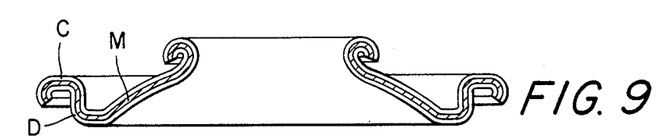
Figure 10:
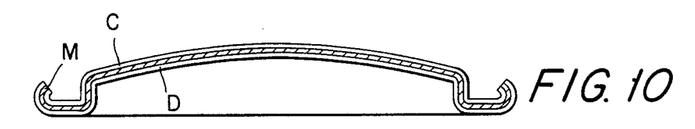

The laminates described in Examples 41 to 43, 44 and 45, and 46 to 50 were formed in conventional manner into aerosol cups, aerosol cones, and aerosol domes such as those illustrated respectively in FIGS. 8, 9 and 10 of the accompanying drawings.

The ECCS used in Examples 25–29, 31–36 and 41–51 was a conventional commercial product supplied by the British Steel Corporation and was given its ECC treatment in a chromic acid medium containing sulphuric acid catalyst (Type 1). The ECC treatment applied to the steel in Example 30 was in a chromic acid medium containing $HBF_4$ catalyst (Type 2).

The aluminium used in Examples 37–40 was treated in a chromic acid-phosphoric acid medium in the aluminium strip mill after cold rolling and cleaning.

The tinplates used in Example 22 had tin coating weights of 0.5 gms per square metre and 2.8 gms per square metre.

TABLE 3

| EXAMPLE | COMPONENT | EXTERNAL COATING (C) | INTERNAL COATING (D) | METAL (M) |
|---|---|---|---|---|
| 25 | Can end | As Ex 4 - A | As Ex 4 - B | ECCS, 0.21 mm, 450 N/mm$^2$, Type 1 |
| 26 | Can end | As Ex 9 - A | As Ex 9 - B | " |
| 27 | Can end | As Ex 4 - B$^a$ | As Ex 4 - A | " |
| 28 | Can end | As Ex 4 - A | As Ex 22 - B$^b$ | " |
| 29 | Can end | As Ex 9 - B$^b$ | As Ex 9 - A | " |
| 30 | Can end | As Ex 19 - A | As Ex 19 - B | ECCS, 0.21 mm, 450 N/mm$^2$, Type 2 |
| 31 | Can end | As Ex 16 - A | As Ex 9 - B$^b$ | ECCS, 0.21 mm, 450 N/mm$^2$, Type 1 |
| 32 | Drawn Can | As Ex 9 - B$^b$ | As Ex 23 - A | ECCS, 0.18 mm, 550 N/mm$^2$, Type 1 |
| 33 | Drawn Can | As Ex 16 - A | As Ex 9 - B$^b$ | " |
| 34 | Drawn Can | As Ex 23 - A | As Ex 23 - B | " |
| 35 | Can End | As Ex 4 - A | As Ex 22 - B | ECCS, 0.24 mm, 550 N/mm$^2$ |
| 36 | Can End | As Ex 9 - B$^b$ | As Ex 16 - A (25 micron) | " |
| 37 | Can end | As Ex 22 - A | As Ex 22 - B | Aluminium, 5182, 0.33 mm |
| 38 | Can end | As Ex 9 - A | As Ex 9 - B | " |
| 39 | DWI Can | As Ex 9 - B$^b$ | As Ex 9 - A | Aluminium, 3004, 0.317 mm |
| 40 | DWI Can | As Ex 16 - A | As Ex 22 - B | |
| 41 | Aerosol Cup | As Ex 4 - A | AS Ex 15 - B | ECCS, 0.27 mm, 330 N/mm$^2$ |
| 42 | Aerosol Cup | As Ex 4 - A | As Ex 4 - B (200 micron) | " |
| 43 | Aerosol Cup | As Ex.8 - A | As Ex 8 - B (160 micron) | " |
| 44 | Aerosol Cone | As Ex 4 - A | As Ex 22 - B | ECCS, 0.33 mm, 350 N/mm$^2$ |
| 45 | Aerosol Cone | As Ex 9 - B$^b$ | As Ex 9 - A | " |
| 46 | Aerosol Dome | As Ex 9 - B$^b$ | As Ex 9 - A | ECCS, 0.26 mm, 450 N/mm$^2$ |
| 47 | Aerosol Dome | As Ex 16 - A | As Ex 16 - B | " |
| 48 | Aerosol Dome | As Ex 9 - A | As Ex 9 - B | " |
| 49 | Aerosol Dome | As Ex 16 - A | As Ex 16 - B (40 micron) | ECCS, 0.26 mm, 450 N/mm$^2$ |
| 50 | Aerosol Dome | As Ex 10 - B$^b$ | As Ex 10 - A | " |
| 51 | Drawn Can | As Ex 4 - A | As Ex 4 - B | ECCS, 0.18 mm, 550 N/mm$^2$ |

Notes
$^a$Contains 5000 ppm synthetic silica in outer five micron layer
$^b$Contains 20% toned titanium dioxide in 29 micron centre layer, 8% titanium dioxide and 5000 ppm synthetic silica in outer 5 micron layer.

The coating performance of the polymer films laminated to the products of Examples 25 to 51 was ascertained by subjecting the products to various tests including the following:

Double Seaming 73 mm diameter can ends were formed from the laminate curled. The ends were seamed onto welded seam can bodies using a conventional end seaming machine.

The coating was studied for fibrillation, scuffing or damage. Coating coverage was assessed by immersion in acidifed copper sulphate for two minutes and visual inspection for copper deposits.

Formability

Formability was assessed by the coating coverage after cans had been formed. Coverage was assessed as described above under Double Seaming.

Protection

Protection was gauged by accelerated tests simulating packing with agressive products for 6 to 12 months, enamel rater values and actual shelf life tests with specific products.

| | |
|---|---|
| Typical accelerating media | acetic acid (1.5%) |
| | sodium chloride (1.0%) in water |
| | citric acid (0.63%) |
| | sodium chloride (1.0%) |
| | malic acid (0.42%) |
| | water to pH 4.3 |
| Typical test conditions | retort at 121° C. for one hour |
| | store for 24 hours |
| Components or cans were inspected after the test and the extent of corrosion compared with conventionally coated containers. | |
| Enamel Rater Values | Sodium chloride solution 6.4 volts |
| | Monitor current |
| | 2 mA acceptable limit |

End Sealing

Polymer coated ends were seamed or swaged in the case of valve cups onto their counter part can body or component, using no lining compounds. Cans were filled with product and pressurised. Weight loss measurements were made to compare propellant loss rates with conventional components having lining compound. A loss rate lower than conventional was regarded as acceptable.

Some of the advantageous properties of the products of Examples 25 to 51 are set out below:

| Examples | Properties |
|---|---|
| 25-31 | Good external double seaming protection, and good protection. |
| 28, 29, 31 | Attractive white appearance. |
| 32-34, 51 | Good formability and protection. |
| 32, 33 | Attractive white appearance. |
| 35-38 | Good external double seaming protection and protection. |
| 35 | Can end requires no lining compound. |
| 39, 40 | Good formability and protection. |
| 41-43 | Cup requires no sealing compound. Excellent protection. |
| 44 | Cone requires no lining compound. |
| 45 | Attractive white external appearance. |
| 46, 50 | Attractive white external appearance. |
| 48, 49 | Dome requires no lining compound. |

What is claimed is:

1. A process for producing by simultaneous lamination a polymer/metal/polymer laminate, which process comprises laminating to one of the major surfaces of a metal sheet a composite polyester film (A) comprising an inner layer (A1) of a substantially non-crystalline linear polyester having a softening point below 150° C. and a melting point above 150° C. but below 240° C. and an outer layer (A2) of a linear polyester having a melting point above 220° C., and simultaneously laminating to the other major surface of the metal sheet a polyolefin-containing film (B) comprising a bonding resin which is an acid modified polyolefin-resin containing carboxyl or anhydride groups, the metal sheet having been heated to a temperature $T_1$ sufficient to cause softening of the polymer films and intimate contact with the metal sheet, the temperature $T_1$ being below the temperature at which the outer surface of the polyolefin-containing film is damaged during lamination, and re-heating the resultant laminate to a temperature $T_2$ sufficient to cause each of the polymer films (A1) and (B) to interact with and become bound to the respective surface of the metal sheet.

2. A process according to claim 1, wherein the temperature $T_1$ is from 120 to 240° C.

3. A process according to claim 1, wherein the laminate is reheated by induction heating means.

4. A process according to claim 1, wherein the laminate is reheated by infra-red heating means.

5. A process according to claim 1, wherein the temperature $T_2$ is from 230° to 270° C.

6. A process according to claim 5, wherein the laminate is heated to a temperature in the range 230° to 270° C. and then held above 200° C. for at least 1 second before being quenched.

7. A process according to claim 6, wherein the laminate is heated to a temperature of 250° C., and then held above 240° C. for 2 seconds before being quenched.

8. A process according to claim 6, wherein the laminate is quenched rapidly and uniformly.

9. A process according to claim 6, wherein the laminate is quenched rapidly and uniformly by immersion in a tank of water or by line quenching with water.

10. A process according to claim 1, wherein the polyester of inner layer (A1) is a copolymer of ethylene terephthalate and ethylene isophthalate, or a copolymer formed from terephthallic acid and two alcohols.

11. A process according to claim 10, wherein the mole ratio of ethylene terephthalate to ethylene isophthalate is 80:20.

12. A process according to claim 1, wherein the outer layer (A2) is a biaxially oriented polyester.

13. A process according to claim 12, wherein the polyester of outer layer (A2) has a crystallinity greater than 30%.

14. A process according to claim 12, wherein the polyester of outer layer (A2) has a crystallinity from 40 to 50%.

15. A process according to claim 1, wherein the outer layer (A2) is polyethylene terephthalate.

16. A process according to claim 1, wherein the polyolefin-containing film (B) is a monolayer of, or is a composite film comprising (a) an inner layer (B1), of a bonding resin chosen from a maleic anhydride modified propylene, maleic anhydride modified polyethylene, maleic anhydride modified ethylene-propylene copolymer, or maleic anhydride modified ethylene-vinylacetate copolymer, and (b) an outer layer (B2) of a polyolefin or polyamide adhered to inner layer (B1).

17. A process according to claim 16, wherein the maleic anhydride content of the bonding resin is from 0.05 to 0.5%.

18. A process according to claim 16, wherein the maleic anhydride content of the bonding resin is from 0.1 to 0.25%.

19. A process according to claim 1, wherein the polyolefin-containing film (B) is a monolayer of, or is a composite film comprising (a) an inner layer (B1) of, a bonding resin chosen from an ethylene-acrylic acid copolymer or an ethylene-methacrylic acid copolymer, and (b) an outer layer (B2) of a polyolefin or polyamide adhered to inner layer (B1).

20. A process according to claim 1, wherein the polyolefin-containing film (B) is a composite film comprising an inner layer (B1) of bonding resin and an outer layer (B2) of a polyolefin or polyamide adhered to inner layer (B1).

21. A process according to claim 20, wherein the polyolefin-containing film comprises a further polyolefin or polyamide layer (B4) adhered to layer (B2) by means of an intermediate layer (B3) of bonding resin.

22. A process according to claim 1, wherein the metal sheet is steel coated with a layer of chromium metal, followed by a layer of chromium oxide.

23. A process according to claims 1, wherein the polyester of inner layer (A1) is a copolymer of ethylene terephthalate and ethylene isophthalate, or a copolymer formed from terephthallic acid and ethylene glycol and cryclohexanedimethanol.

24. A process according to claim 23, wherein the mole ratio of ethylene terephthalate to ethylene isophthalate is 80:20.

25. A process according to claim 1, wherein the outer layer (A2) is biaxially oriented polyethylene terephthalate.

26. A process according to claim 1, wherein the polyolefin-containing film (B) is a monolayer of, or is a composite film comprising (a) an inner layer (B1) of, a bonding chosen from an ethylene-acrylic acid copolymer or an ethylene-methacrylic acid copolymer containing from 5 to 15% by weight of acid, and (b) an outer layer (B2) of a polyolefin or polyamide adhered to inner layer (B1).

27. A polymer/metal/polymer laminate comprising a metal sheet having a polymer film adhered to each of its major surfaces, the polymer films having been adhered to the metal sheet by simultaneous thermal lamination, the polymer film adhered to one major surface of the metal sheet being a composite polyester film (A) comprising an inner layer (A1) of a substantially non-crystalline linear polyester having a softening point below 150° C. and a melting point above 150° C. but below 240° C. and an outer layer (A2) of a linear polyester having a melting point above 220° C., and the polymer film adhered to the other major surface of the metal sheet being a polyolefin-containing film (B) comprising a bonding resin which is an acid modified polyolefin resin containing carboxyl or anhydride groups.

28. A laminate according to claim 27, wherein the polyester of inner layer (A1) is a copolymer of ethylene terephthalate and ethylene isophthalate, or a copolymer formed from terephthallic acid and two alcohols.

29. A laminate according to claim 28, wherein the mole ratio of ethylene terephthalate to ethylene isophthalate is 80:20.

30. A laminate according to claim 27, wherein the outer layer (A2) is a biaxially oriented polyester.

31. A laminate according to claim 30, wherein the polyester of outer layer (A2) has a crystallinity greater than 30%.

32. A laminate according to claim 30, wherein the polyester of outer layer (A2) has a crystallinity from 40 to 50%.

33. A laminate according to claim 27, wherein the outer layer (A2) is polyethylene terephthalate.

34. A laminate according to claim 27, wherein the polyolefin-containing film (B) is a monolayer of, or is a composite film comprising (a) an inner layer (B1), of a bonding resin chosen from a maleic anhydride modified propylene, maleic anhydride modified ethylene-propylene copolymer, maleic anhydride modified polyethylene, or maleic anhydride modified ethylene-vinylacetate copolymer, and (b) an outer layer (B2) of a polyolefin or polyamide adhered to inner layer (B1).

35. A laminate according to claim 34, wherein the maleic anhydride content of the bonding resin is from 0.05 to 0.5%.

36. A laminate according to claim 34, wherein the maleic anhydride content of the bonding resin is from 0.1 to 0.25%.

37. A laminate according to claim 27, wherein the polyolefin-containing film (B) is a monolayer of, or is a composite film comprising (a) an inner layer (B1) of, a bonding resin chosen from an ethylene-acrylic acid copolymer or an ethylene-methacrylic acid copolymer, and (b) an outer layer (B2) of a polyolefin or polyamide adhered to inner layer (B1).

38. A laminate according to claim 27, wherein the polyolefin-containing film (B) is a composite film comprising an inner layer (B1) of bonding resin and an outer layer (B2) of a polyolefin or polyamide adhered to inner layer (B1).

39. A laminate according to claim 38, wherein the polyolefin-containing film comprises a further polyolefin or polyamide layer (B4) adhered to layer (B2) by means of an intermediate layer (B3) of bonding resin.

40. A laminate according to claim 27, wherein the metal sheet is steel coated with a layer of chromium metal followed by a layer of chromium oxide.

41. A laminate according to claim 27, wherein the polyester of inner layer (A1) is a copolymer of ethylene terephthalate and ethylene isophthalate, or a copolymer formed from terephthallic acid and ethylene glycol and cryclohexane-dimethanol.

42. A laminate according to claim 41, wherein the mole ratio of ethylene terephthalate to ethylene isophthalate is 80:20.

43. A laminate according to claim 41, wherein the outer layer (A2) is a biaxially oriented polyester.

44. A laminate according to claim 27, wherein the outer layer (A2) is biaxially oriented polyethylene terephthalate.

45. A laminate according to claim 27, wherein the polyolefin-containing film (B) is a monolayer of, or is a composite film comprising (a) an inner layer (B1) of, a bonding resin chosen from an ethylene-acrylic acid copolymer or an ethylene-methacrylic acid copolymer containing from 5 to 15% by weight of acid, and (b) an outer layer (B2) of a polyolefin or polyamide adhered to inner layer (B1).

46. A container or a component for a container produced from a polymer/metal/polymer laminate comprising a metal sheet having a polymer film adhered to each of its major surfaces, the polymer films having been adhered to the metal sheet by simultaneous thermal lamination, the polymer film adhered to one major surface of the metal sheet being a composite polyester film (a) comprising an inner layer (A1) of a substantially non-crystalline linear polyester having a softening point below 150° C. and a melting point above 150° C. but below 240° C. and an outer layer (A2) of a linear polyester having a melting point above 220° C., and the polymer film adhered to the other major surface of the metal sheet being a polyolefin-containing film (B) comprising a bonding resin which is an acid modified polyolefin resin containing carboxyl or anhydride groups.

* * * * *